United States Patent
Rodniansky et al.

(10) Patent No.: US 11,349,875 B2
(45) Date of Patent: May 31, 2022

(54) DYNAMIC BALANCING OF SECURITY RULES EXECUTION IN A DATABASE PROTECTION SYSTEM

(71) Applicant: International Business Machines Corporation, Armonk, NY (US)

(72) Inventors: Leonid Rodniansky, Allston, MA (US); Tania Butovsky, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/546,357

(22) Filed: Aug. 21, 2019

(65) Prior Publication Data
US 2021/0058429 A1 Feb. 25, 2021

(51) Int. Cl.
*H04L 9/40* (2022.01)
*H04L 43/0888* (2022.01)
*H04L 67/62* (2022.01)
*H04L 45/00* (2022.01)
*H04L 43/08* (2022.01)

(52) U.S. Cl.
CPC ........... *H04L 63/20* (2013.01); *H04L 43/08* (2013.01); *H04L 43/0888* (2013.01); *H04L 45/38* (2013.01); *H04L 63/14* (2013.01); *H04L 63/16* (2013.01); *H04L 67/325* (2013.01)

(58) Field of Classification Search
CPC ......... H04L 63/20; H04L 63/14; H04L 63/16; H04L 43/0888; H04L 67/325; H04L 45/38; H04L 67/02; H04L 41/0816; H04L 43/0817; H04L 43/08; H04L 63/0263
See application file for complete search history.

(56) References Cited

U.S. PATENT DOCUMENTS

| | | | |
|---|---|---|---|
| 6,154,775 A | 11/2000 | Coss et al. | |
| 8,646,026 B2 * | 2/2014 | Chang | H04L 63/20 726/1 |
| 8,825,858 B1 * | 9/2014 | Atchity | H04L 47/788 709/224 |
| 9,088,509 B1 * | 7/2015 | Sella | H04L 43/16 |
| 9,495,417 B2 | 11/2016 | Beilmann et al. | |

(Continued)

*Primary Examiner* — Ramy M Osman
(74) *Attorney, Agent, or Firm* — Jeffrey S. LaBaw; David H. Judson (57) ABSTRACT

A database protection system (DPS) is configured to dynamically-optimize security rule validation throughput based on evaluating resource consumption data collected from prior validations. In particular, the DPS analyzes collected resource consumption information and determines which security rules in a set should then be active. To this end, the DPS is configured with multiple security rules engines (SREs), and each is configured to evaluate the same set of security rules. When an SRE applies a validation (to a request or response flow), an associated collector collects and analyzes associated resource consumption data. This data is provided to an optimizer, which receives similar resource consumption data from other SREs. Based on the resource consumption data collected from the SRE collector(s), the optimizer dynamically optimizes security rules validation in real-time, e.g., by dynamically switching on or off given security rule(s) in the set of security rules at given one(s) of the SREs.

21 Claims, 4 Drawing Sheets

(56) References Cited

U.S. PATENT DOCUMENTS

| | | | |
|---|---|---|---|
| 2002/0078348 A1* | 6/2002 | Leung | G06F 21/602 713/164 |
| 2005/0108537 A1* | 5/2005 | Puri | G06F 21/64 713/176 |
| 2007/0250929 A1* | 10/2007 | Herington | G06F 21/566 726/24 |
| 2008/0162452 A1* | 7/2008 | Cox | H04L 41/0893 |
| 2009/0319658 A1* | 12/2009 | Chioiu | H04L 41/5009 709/224 |
| 2011/0117909 A1* | 5/2011 | Cao | H04W 48/18 455/423 |
| 2011/0228781 A1* | 9/2011 | Izenberg | H04L 45/60 370/392 |
| 2014/0019964 A1* | 1/2014 | Neuse | G06F 9/45558 718/1 |
| 2014/0059641 A1* | 2/2014 | Chapman, II | H04L 63/1441 726/1 |
| 2014/0137104 A1* | 5/2014 | Nelson | G06F 9/45558 718/1 |
| 2014/0237538 A1* | 8/2014 | Rodniansky | H04L 63/10 726/1 |
| 2014/0281008 A1* | 9/2014 | Muthiah | H04L 65/607 709/231 |
| 2015/0074792 A1* | 3/2015 | Tarreau | H04L 63/0227 726/13 |
| 2015/0242531 A1 | 8/2015 | Rodniansky | |
| 2016/0147550 A1* | 5/2016 | McWilliams | G06F 9/45558 718/1 |
| 2016/0301624 A1* | 10/2016 | Gonzalez | G06F 9/5083 |
| 2017/0147399 A1* | 5/2017 | Cropper | G06F 9/45533 |
| 2017/0180423 A1 | 6/2017 | Nimmagadda et al. | |
| 2017/0318027 A1* | 11/2017 | Rodniansky | H04L 63/1425 |
| 2017/0364576 A1* | 12/2017 | Chesla | G06F 16/285 |
| 2018/0124114 A1 | 5/2018 | Woods et al. | |
| 2018/0324218 A1* | 11/2018 | Xie | H04L 63/1433 |
| 2020/0162496 A1* | 5/2020 | Medalion | H04L 63/1433 |
| 2020/0177621 A1* | 6/2020 | Boulton | H04L 67/32 |
| 2020/0177638 A1* | 6/2020 | Salman | H04L 63/14 |
| 2022/0038428 A1* | 2/2022 | Rodniansky | H04L 63/20 |

* cited by examiner

DYNAMIC BALANCING OF SECURITY RULES EXECUTION IN A DATABASE PROTECTION SYSTEM

BACKGROUND OF THE INVENTION

Technical Field

This disclosure relates generally to securing resources in a distributed computing environment and, in particular, to database access security.

Background of the Related Art

Modern information processing environments typically use an application-server model instead of a traditional client-server model. The application server-based architecture allows each application to perform specific and/or specialized portions of processing before handing a transaction or data stream off to a successive processing tier. An application-server model may utilize a multi-tier arrangement or architecture. In a multi-tier arrangement, each tier is responsible for performing a particular aspect of processing, e.g., database or application tiers can process different data. Different tiers communicate by passing or transmitting data, often according to a predetermined protocol or data structure. A business transaction is therefore passed between tiers, which may be successive layers or nodes in the processing stream. Accordingly, each tier "layer" receives a transaction from a preceding layer.

A multi-tier architecture of this type may include or be associated with a database protection solution/system (DPS). Systems of this type analyze database access by a client application, typically by monitoring a network or local access to the database server, thereby enabling monitoring of transactions to identify suspicious behavior. In a typical solution, an agent (which may be a proxy, or other monitoring functionality) operates to monitor both requests (to the server) and responses (from the server). The requests and responses are forwarded to a security mechanism, which typically includes various components, such as a protocol analyzer module, a statements/commands parser, a policy validation module, and an alert module. The security mechanism is configured to examine the requests and the responses. In particular, a database query that is sent by the database client application to the database server is extracted from the database protocol packets intercepted by the agent; the security mechanism then parses this query up to a database object level, validates the query against one or more security policies for a potential database object access violation, and issues an appropriate alert if an access violation is detected. The system may also suspend database client connection(s) when a security anomaly or violation is detected. A commercial product that provides this type of database access control system functionality is IBM® Guardium®.

Because the DPS acts as an enforcement point when inspecting multiple simultaneous database connections (often many thousands per second), it is important to maximize DPS throughput. As described, the DPS has a module that validates a request or response payload against a set of security rules, typically defined by a security administrator. As the number of concurrent connections increases, however, current DPS solutions often are unable to keep up with the request-response flow(s), thereby increasing the likelihood that the system cannot provide true real-time validation.

Thus, there remains a need to provide a DPS architecture that is highly available and scalable, and that ensures good security rule validation throughput even as the number of multiple simultaneous database connections is large. The technique of this disclosure addresses this need.

BRIEF SUMMARY

A database protection system (DPS) is augmented according to this disclosure to provide additional functionality to enable efficient management and handling of security rules evaluation(s). In this approach, the DPS is configured to dynamically-optimize security rule validation throughput, preferably based on evaluating resource consumption data collected from prior evaluation of the security rule(s). In particular, the DPS analyzes the collected resource consumption information and determines which security rules in a set should then be active.

In a representative embodiment, the DPS is configured with two (2) or more security rules engines (SREs), and each of the engines is configured to evaluate the same available set of security rules. When a security rules engine (SRE) applies a validation (to a request or response flow), an associated collector collects and analyzes associated resource consumption data (e.g., CPU parameters and usage, available memory, I/O consumption, etc.) associated with that validation operation. This resource consumption data (e.g., for each security rule validation) is then provided to an DPS optimizer, which receives similar resource consumption data from one or more other security rules engines. The optimizer analyzes the collected resource consumption data and evaluates which rules in the set of security rules (when validated by the SREs) consume the most resources, as well as the nature of that resource consumption. The optimizer also comprises or has associated therewith a rules distributor function. Based on the resource consumption data collected from the SRE collector(s), the optimizer dynamically optimizes security rules validation in real-time, e.g., by dynamically switching on or off given security rule(s) in the set of security rules at given one(s) of the SREs. Thus, for example, if the optimizer has determined that validation of a given security rule is consuming too many resources, it may instruct the SREs to cease (or de-prioritize) further validation of that security rule at one or more of the SREs, e.g., to attempt to optimize a maximal average validation mechanism throughput for the system as a whole.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
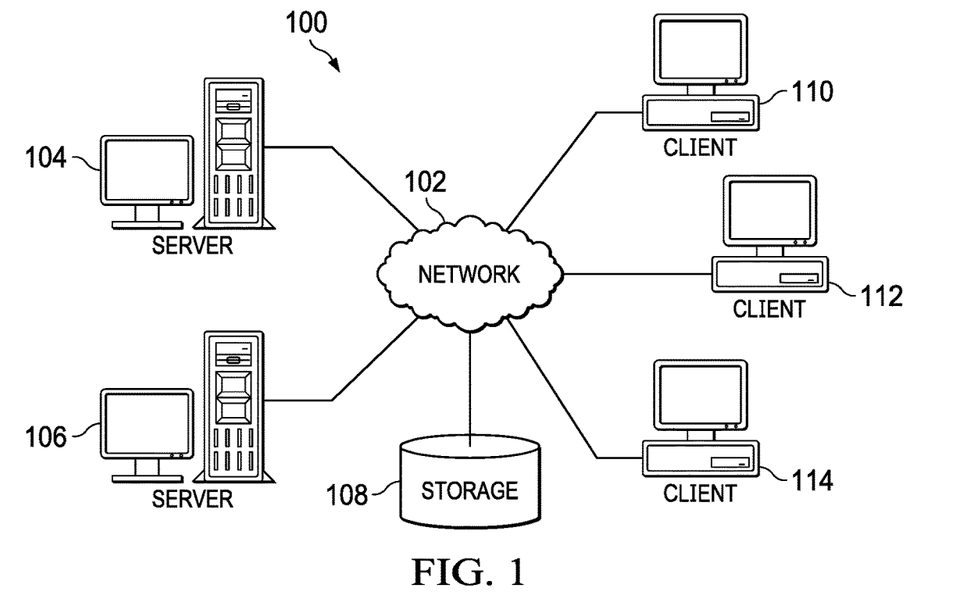
FIG. 1 depicts an exemplary block diagram of a distributed data processing environment in which exemplary aspects of the illustrative embodiments may be implemented.
Figure 2:
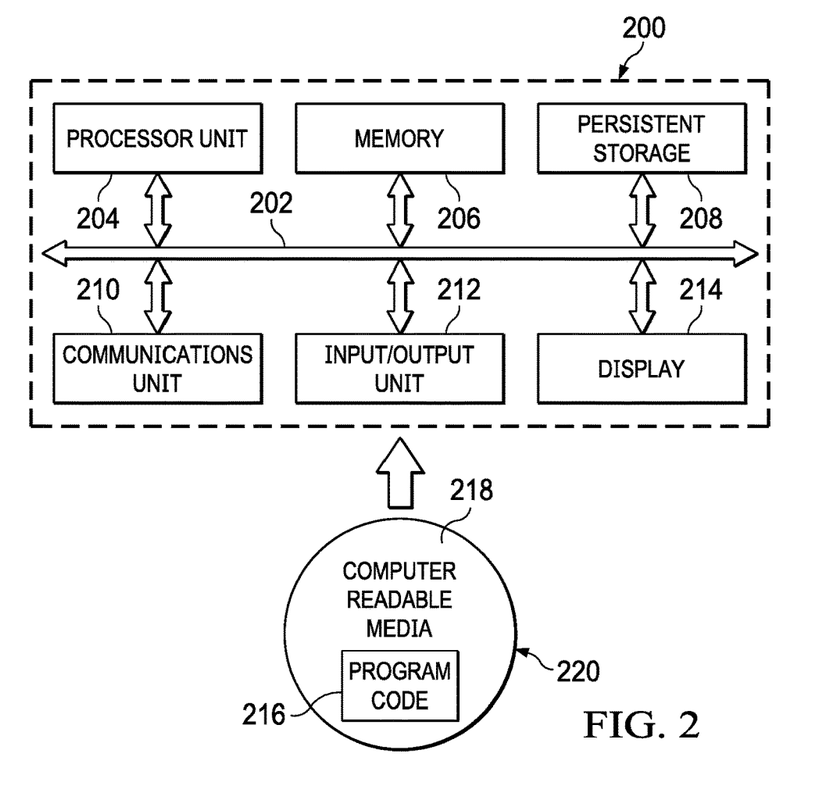
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Monitored Server Security Systems

Figure 3:
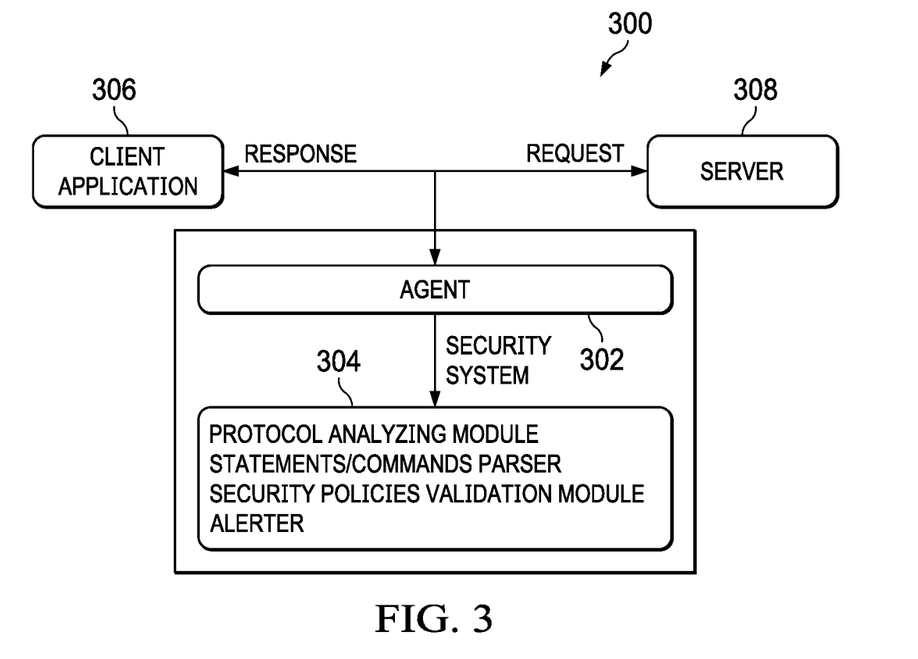
FIG. 3 depicts a generalization of a security system for monitoring a server in a client-server operating environment.

As described above, it is known to protect servers using intrusion detection. Security systems of this type typically analyze server access attempts by monitoring a network or local access to the server. FIG. 3 depicts a general solution of this type. As depicted, in this system 300 a client application 306 interacts with a server 308, and an agent 302 (which may be a proxy, or other monitoring functionality) operates to monitor both requests (to the server) and responses (from the server). The requests and responses are forwarded to a security mechanism 304. The security mechanism 304 typically includes various components, namely, a protocol analyzer module, a statements/commands (or "statement/command") parser, a policy validation module, and an alert module. Generally, the security mechanism is configured to examine the requests and the responses.

In particular, the agent 302 is configured to examine the application protocol request or response. Such a request/response is represented in the form of application protocol structure. Different types of clients/servers use different application protocol and statements/commands languages, although typically the request and response flow is common. Typically, a request contains application protocol metadata. The protocol analyzing module extracts a statement/command from the request. To this end, the protocol analyzing module needs to be aware of the applicable application protocol structures. Statements/commands extracted by the protocol analyzing module are then passed to the statement/command parser for evaluation. The statement/command parser may successfully parse the statement/command extracted by the protocol analyzing module, in which case the statement is then evaluated against one or more security policies. As also previously described, in certain situations, however, the statement/command parser cannot successfully parse the statement/command extracted by the protocol analyzing module. This operating scenario is addressed by the technique of this disclosure, as will be described below.

Figure 4:
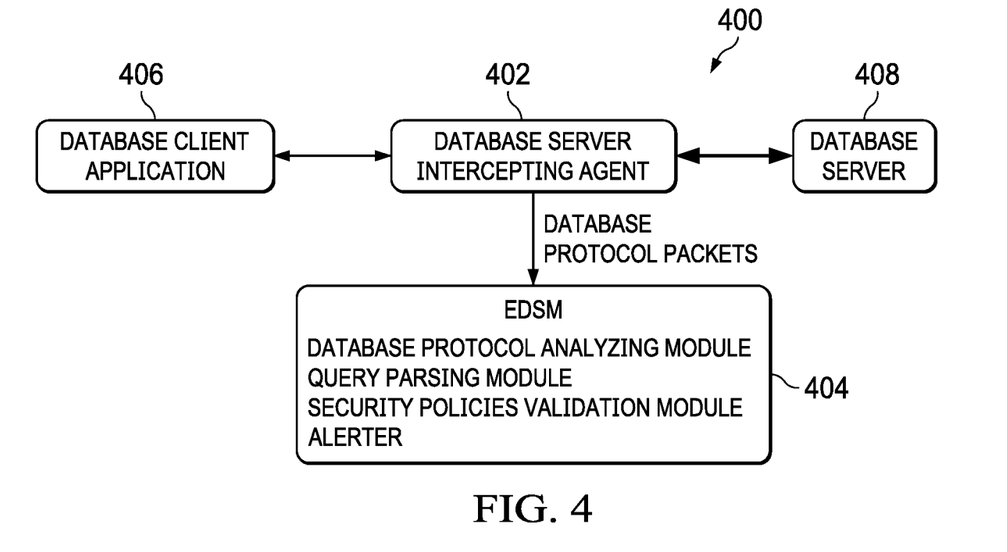
FIG. 4 depicts an access control system (e.g., for a database) that is structured with a security mechanism in accordance with the technique shown in FIG. 3.

By way of additional background, FIG. 4 depicts the basic operation of a database access control system 400 that comprises a database server intercepting agent 402 and an associated database security mechanism, e.g., an external-to-database security mechanism (EDSM) 404. As a skilled person will appreciate, the access control system in FIG. 4 is a special case of the generalized security system architecture depicted in FIG. 3. As depicted in FIG. 4, in this embodiment the agent 402 is situated in-line between a database client application 406, and a database server 408. Queries initiated to the database server 408 by the database client application 406 are intercepted by agent 402, and database protocol packets comprising those queries are forwarded to the EDSM 410 for evaluation. In this embodiment, the intercepting agent 402 typically also monitors the responses received from the database server 408. Typically, a database protocol packet refers to a formatted unit of data used in communication between the database client application and the database server. As is known, EDSM 410 typically includes several modules, e.g., a database protocol analyzing module, a query parsing module, a security policy validation module, and an alerting module. These modules typically are implemented as software executing in hardware. One core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Figure 5:
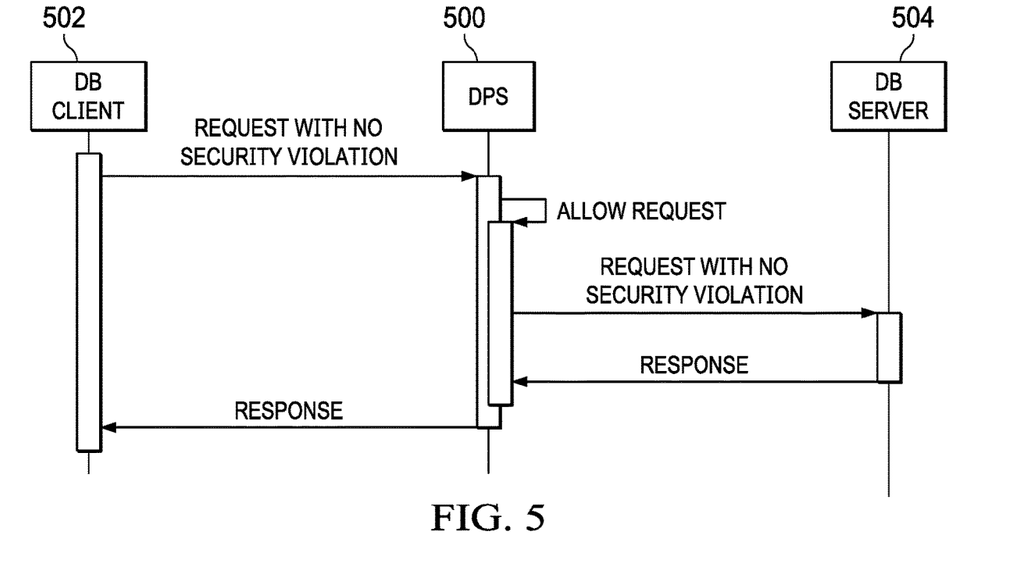
FIG. 5 depicts a Database Protection Solution/system in which the techniques of this disclosure may be implemented.

FIG. 5 depicts a representative operation of a database protection solution/system (DPS) when a database request does not involve a security violation. It should be appreciated that the nomenclature "security violation" is not intended to be limiting. The DPS may be configured to identify an actual violation (e.g., of some configured security policy), or the DPS may simply observe an operation that it determines to be "anomalous" or other suspicious. In this example, the DPS 500 is positioned intermediate a database client 502, and a database server 504 (corresponding generally to the configuration shown in FIG. 3). As has been described, the DPS typically operates by intercepting the traffic between the endpoints, namely, database queries from the client, and database responses from the server. The DPS 500 maintain a set of security rules (one or more security policies) defining how to handle each security situation. An example security rule includes suspending the database application and releasing the database server resources for application connection where access to one or more database objects is not authorized by the security rules. The DPS 500 may correspond to the agent and EDSM components in FIG. 4, or it may be operated or configured as a separate computing system. It is not required to have knowledge or logic to assemble database protocol structures.

As depicted, the database client 500 issues a request, in this case one that (when intercepted and evaluated by the DPS) will not trigger a security violation determination. The DPS 500 thus allows the request to pass through to the database server 504 over the connection depicted. The database server 504 returns a response, and that response is then passed through the DPS and returned to the database client 502 over the connection, which is then closed.

As previously described, the DPS mechanism 500 includes logic to terminate the database connection, however, when a security anomaly/violation is identified. Shutting down the connection, however, causes an abnormal event (an exception) on the client side, and the database client 502 tries to handle this event by attempting to restore the security-violating connection. This creates communications and processing inefficiencies. This problem is addressed and solved by the subject matter of this disclosure, which is now described.

Another way of characterizing the DPS is that it acts as a security rule enforcement point for the database connections.

Dynamic Balancing of Security Rules Validations Based on Resource Consumption

According to this disclosure, a database protection system such as described includes additional functionality to enable highly-available and scalable management and handling of security-violating database client connections. To this end, the DPS is configured to dynamically-optimize security rule validation throughput, preferably based on evaluating resource consumption data collected from prior evaluation of the security rule(s). In operation, the DPS analyzes the collected resource consumption information and, based at least in part on that information, determines which security rules in a set should then be active (or perhaps prioritized).

Figure 6:
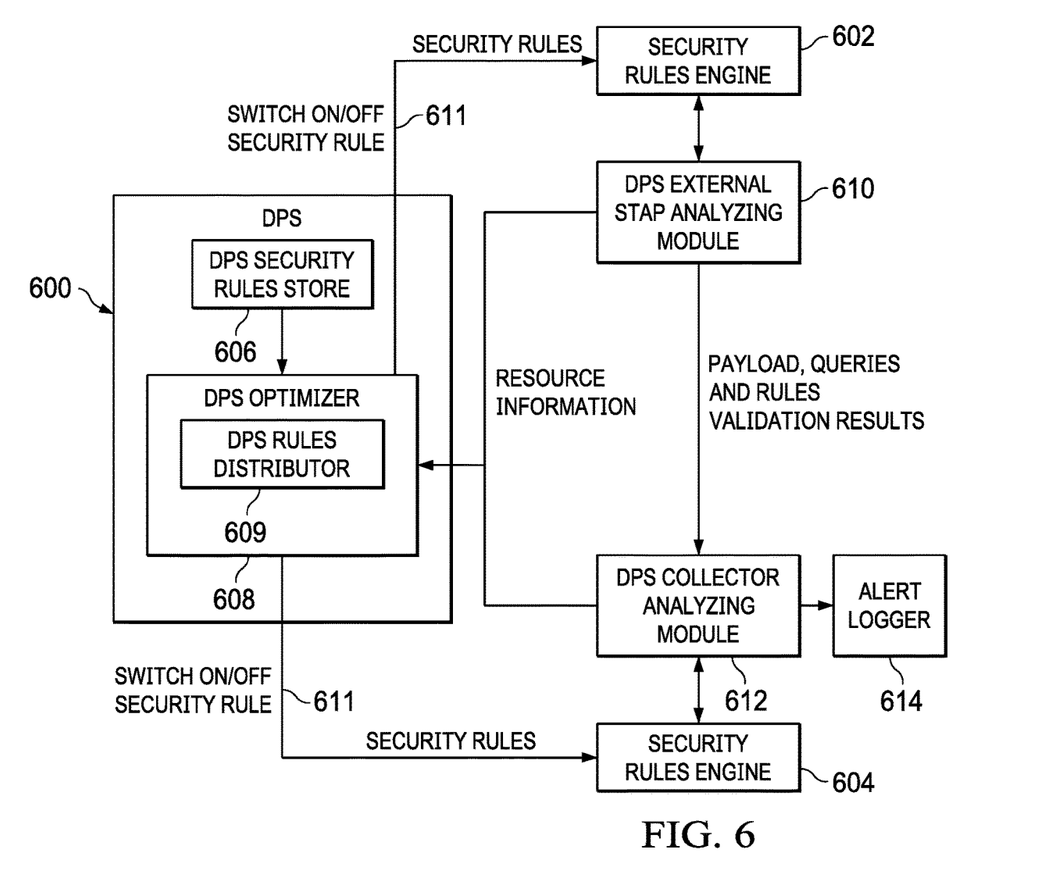
FIG. 6 depicts the DPS architecture in FIG. 5 that is augmented to provide a mechanism for dynamically-balancing security rules execution to optimize security rule validation throughput according to the technique of this disclosure.

With reference now to FIG. 6, which is a representative embodiment, the DPS 600 is configured with two (2) or more security rules engines (SREs) 602 and 604, and each of the engines is configured to evaluate the same available set of security rules. There may be any number of SREs, and typically SRE resources preferably are constant; in an alternative embodiment, the number of SRE resources may vary based on resource consumption history or other factors. The security rules are maintained in a DPS security rules data store 606. Typically, the set of security rules are defined by an administrator. According to this disclosure, the DPS also includes a DPS optimizer 608 that includes an associated DPS rules distributor function 609 to be described. As also depicted, each SRE has associated therewith an external collector and analyzing component, which are depicted at 610 and 612.

In one embodiment, the collector components are implemented by a lightweight software agent installed on or in association with a database server system. A representative example is IBM® Guardium® S-TAP® agent, which monitors database traffic and forwards information about that traffic to a DPS appliance, which can be deployed anywhere on the network. In addition to monitoring local connections, the DPS agent can be used to monitor any network traffic that is visible from the database server on which it is installed. It can thus act as a collector on remote network segments, even where it is not practical to install a DPS appliance. As an alternative, and depending on implementation, an operating system kernel module (e.g., Guardium K-TAP) may be used, e.g., collect local traffic on a Unix database server. Another example agent is Guardium A-TAP (application-level tapping), which is a mechanism that monitors communication between internal components of the database server. Another utility that may be used for the collecting function include LHMON, a packet-capturing mechanism that listens to network traffic from and to a database server.

Validation of a security rule by the SRE typically is carried out in the manner described above, e.g., the process flow in FIG. 4. As described, this involves validating a request or response (or, more generally, some operation) against a security rule. Example security rules typically include alerting about access to the database objects (e.g., tables, views, procedures, and the like) from unauthorized users. The nature and resources required for validation may vary depending on the security rule, as validation of different security rules typically requires utilization of different underlying computational, storage and I/O resources depending on the rule scope, and the information needed for its evaluation. Indeed, some security rules are defined/configured with complex predicates, thereby increasing the underlying resources needed for their evaluation. Thus, in general, the technique of this disclosure assumes that the resources required to validate given security rules is variable across the set of security rules.

Referring now back to FIG. 6, when a security rules engine (SRE) (602, or 604) applies a validation (to a request or response flow), an associated collector (610, or 612) collects and analyzes associated resource consumption data associated with that validation operation. The nature of the resource consumption data collected depends on the implementation of the security rules engine and its associated collector; typically, the resource consumption data includes, without limitation, CPU parameters and usage, available and consumed memory, process execution time, current rule performance impact on the operating system, other I/O consumption parameters, latency, and the like. The resource consumption data may be collected for a particular validation operation, or for a collection of validation operations (e.g., those that occur within a given time period, those that originate from a particular client connection, and so forth).

The resource consumption data (collected for the security rule validation(s)) associated with a particular SRE is then provided by the collector to the DPS optimizer 608, which receives similar resource consumption data from one or more other of the security rules engines. Depending on the scale of the DPS system (i.e., the number of SREs, the size of the security rule set, etc.), there may be more than one instance of the optimizer 608. In general, the optimizer analyzes the collected resource consumption data and, based on a given configured function, heuristic or other learning process, evaluates which rules in the set of security rules (when validated by the SREs) consume the most resources, as well as the nature of that resource consumption. The particular technique(s) by which the optimizer 608 determines which of the security rule validations (and thus which security rules) are utilizing the most resources is not a limitation. Representative techniques that can be used for this purpose include, without limitation, evaluation of a statistical function that collects historical resource consumption data, evaluation of a probability function, evaluating current data against a machine learning model, and the like.

By collecting resource consumption for the set of security rules, the optimizer dynamically determines the resources (e.g., CPU, memory, I/O, etc.) utilized for security rule validation. The nature and scope of the resource determination may vary, and the optimizer may make such determination with respect to a particular resource type (e.g., CPU), or with respect to a particular resource grouping (e.g., CPU and memory), or with respect to any other combination of the resource consumption data available. The optimizer may selectively prune old data, or otherwise pre-process the resource consumption data as needed to facilitate its (preferred) real-time operation. With the resource consumption information available for all security rules (or at least for those rules that have been validated), the optimizer (which also has or can obtain information concerning the available resources generally) dynamically determines which available resources should be allocated to which security rule validation(s) (typically, which SRE to select to process the rule). Preferably, the determination is carried out periodically, or upon demand, upon a given occurrence in the DPS system, or the like, and the determination (and the associated security rule distribution (to the DPS SRE instances) is carried out synchronously or asynchronously with respect to other DPS tasks. The optimizer selects which security rules are active based on the available resources. In particular, and the embodiment in FIG. 6, the optimizer decides which subsets of security rules are active in the respective SRE instances.

In general, security rule resource consumption depends on several factors, namely, a complexity of the rule itself, and the amount of rule data input per period of time. Rule complexity typically is predetermined (e.g., as a given resource consumption per kilobyte of input data) when the security rule is created. The actual input data rate typically is not known and is monitored by the DPS (or some other) system. In one embodiment, the optimizer uses a model of the data input, and that model may be statistical (e.g., based on information monitored by the DPS or some other system), deterministic, or some other known construct. A statistical data input model, e.g., may be based on run-time throughput measurements and a presumption that the model can be described by a particular function (e.g., a polynomial). A deterministic data input model may provide more precise predictive capability but requires knowledge about the monitored applications and other resource consuming scheduled tasks, such as backup/restore functions.

The optimizer may also select which security rules are active based on factors in addition to the resource consumption. These other factors may include, without limitation, a number of times that a security rule is expected to be needed to be validated based on history, a current operating context, and the like. There is no requirement that a particular security rule be run. In another variant embodiment, the optimizer may take into consideration additional information including a configured security policy, a function that trades off a given degree of security and resource utilization, or the like. In operation, a security administrator may be notified if particular security rules are not run. Further, and according to a further aspect, if a security rule is using too many resources, the security administrator may be notified of this fact and provided a resource use analysis, thereby enabling the administrator to potentially revise the security rule.

The optimizer also comprises or has associated therewith the rules distributor function 609. Based on the resource consumption data collected from the SRE collector(s), the optimizer 608 dynamically optimizes security rules validation in real-time, e.g., by dynamically switching on or off given security rule(s) in the set of security rules at given one(s) of the SREs. This control switching is indicated at 611. Thus, for example, if the optimizer has determined (e.g., based on historical resource consumption data collected) that validation of a given security rule in the set is consuming too many resources, it may instruct output an instruction or command to cease (or de-prioritize) further validation of that security rule at one or more of the SREs, e.g., to attempt to optimize a maximal average validation mechanism throughput for the system as a whole. In this manner, the optimizer dynamically alters the operation of the SREs such that the engines operate in a more resource-efficient manner with respect to subsequent security rule validations.

It should be appreciated that the above-described architecture (comprising the optimizer/distributor together with the SRE/collectors) provides for a highly-available, scalable and reliable DPS mechanism or framework that efficiently manages security rule validations, preferably in a manner to ensure that an average validation for the rules in the set of security rules is optimized for the system as-a-whole. As described, the DPS optimizer collects information about SRE resource consumption for each security rule, preferably in real-time. It also collects information about available resources in each system in which the SRE is executing. Preferably, the optimizer is configured with a goal, e.g., to maximize combined average throughput for all of the SREs. In a typical solution the optimizer thus decides in which SRE a particular security rule will be active. The rules distributor interoperates with the SREs to then control (select) which security rules in a particular SRE will be active (or inactive). In an example use case, and based on the optimizer determination, the rules distributor switches on (makes active) a given security rule in a first SRE while atomically switching the same rule off (makes inactive) in a second SRE.

The subject matter herein provides numerous advantages. The DPS optimizer and its associated rule distributor maintain dynamic, optimal distribution of security rules among SREs (DPS modules) in real-time. This architecture optimizes the data protection solution throughput dynamically, deciding in which SRE (DPS module) a particular rule from the rule set needs to be validated for optimum efficiency of the system as-a-whole. More generally, this approach thus provides for an improved database access control system that provides resource-efficient security check validations on database queries. The framework is scalable, and it assures that DPS can operate efficiently at all times irrespective of load(s) presented by the request and response traffic flows. Stated another way, the technique of selecting which rules in the set are active based on the available resources minimizes an average validation throughput (at the DPS) for the set of security rules.

In a typical embodiment, the optimizer, rules distributor and the SREs are implemented as computer software (a set of computer program instructions configured as program code) executed by computer hardware. Individual functions (e.g., the optimizer and distributor) may be combined/integrated or separate from another, and the particular functions may be co-located or distributed in whole or in part. Of course, the nomenclature used herein to describe these functions is not intended to be limited. Indeed, the notion of an "optimizer" need not imply some absolute measure of optimization that must be achieved by the described processing.

Generalizing, the enhanced DPS functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud. As already mentioned, a representative commercial DPS in which the described technique may be implemented is IBM® Guardium® DPS, but this is not a limitation. More generally, the technique is implemented at any enforcement point inspecting (for security rule validation) multiple database connections.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the DPS, or the agent and EDSM components, as the case may be, are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the DPS (or agent/EDSM) described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The session information retrieval technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

The DPS system may include or have associated therewith any number of SRE security rule processing engines. Generalizing, an SRE is any DPS (or other computing) module that performs security rule validation.

The techniques herein provide for improvements to another technology or technical field, namely, database access control systems, as well as improvements to the operational capabilities of such systems when used in the manner described.

Having described our invention, what we claim is as follows.

The invention claimed is:

1. A method operative in an enforcement point that inspects request and response traffic flows between a set of clients, and a database server, comprising:

provisioning at least first and second security rules engines (SREs) that perform database security rule validation on the traffic flows, wherein the database security rule validation uses processing, storage and input/output (I/O) resources of the enforcement point;
collecting resource consumption data derived from validation by the one or more rules engines of one or more of a set of security rules against the traffic flows between the set of clients and the database server, the resource consumption data derived from the processing, storage or input/output (I/O) resources of the enforcement point;
based on the resource consumption data for at least some of the set of security rules, dynamically determining the resources of the enforcement point available for database security rule validation; and
based on the available resources of the enforcement point, selecting which security rules in the set of security rules are activated by making a particular security rule active in the first SRE and inactive in the second SRE.

2. The method as described in claim 1 further including distributing the particular security rule only to the first SRE.

3. The method as described in claim 2 further including switching off the particular security rule in the second SRE.

4. The method as described in claim 1 wherein the resource consumption data comprises one of: processor parameters and usage, available and consumed memory, process execution time, current rule performance impact on an operating system, I/O consumption parameters, latency, and combinations thereof.

5. The method as described in claim 1 wherein selecting which security rules in the set are active is also based on an additional information.

6. The method as described in claim 5 wherein the additional information includes one of: security rule validation frequency, and data indicating a current context associated with a traffic flow.

7. The method as described in claim 1 wherein selecting which rules in the set are active based on the available resources maximizes an average validation throughput at the enforcement point for the set of security rules.

8. Apparatus operative in an enforcement point that inspects request and response traffic flows between a set of clients, and a database server, comprising:
a processor;
computer memory holding computer program instructions executed by the processor, the computer program instructions comprising program code configured to:
provision at least first and second security rules engines (SREs) that perform database security rule validation on the traffic flows, wherein the database security rule validation uses processing, storage and input/output (I/O) resources of the enforcement point, wherein the provisioning includes configuring at least first and second security rules engines (SREs);
collect resource consumption data derived from validation by the one or more rules engines of one or more of a set of security rules against the traffic flows between the set of clients and the database server, the resource consumption data derived from the processing, storage or input/output (I/O) resources of the enforcement point;
based on the resource consumption data for at least some of the set of security rules, dynamically determine resources of the enforcement point available for database security rule validation; and based on the available resources of the enforcement point, select which security rules in the set of security rules are activated by making a particular security rule active in the first SRE and inactive in the second SRE.

9. The apparatus as described in claim 8 wherein the program code comprises program code configured to distribute the particular security rule only to the first SRE.

10. The apparatus as described in claim 9 wherein the program code configured to select which security rules are activated includes program code configured to switch off the particular security rule in the second SRE.

11. The apparatus as described in claim 8 wherein the resource consumption data comprises one of: processor parameters and usage, available and consumed memory, process execution time, current rule performance impact on an operating system, I/O consumption parameters, latency, and combinations thereof.

12. The apparatus as described in claim 8 wherein the program code to select which security rules in the set are active is also based on an additional information.

13. The apparatus as described in claim 12 wherein the additional information includes one of: security rule validation frequency, and data indicating a current context associated with a traffic flow.

14. The apparatus as described in claim 8 wherein the program code to select which rules in the set are active based on the available resources maximizes an average validation throughput at the enforcement point for the set of security rules.

15. A computer program product in a non-transitory computer readable medium, the computer program product holding computer program instructions executed by a processor in a data processing system as an enforcement point that inspects request and response traffic flows between a set of clients, and a database server, the computer program instructions comprising program code configured to:

provision at least first and second security rules engines (SREs) that perform database security rule validation on the traffic flows, wherein the database security rule validation uses processing, storage and input/output (I/O) resources of the enforcement point;

collect resource consumption data derived from validation by the one or more rules engines of one or more of a set of security rules against the traffic flows between the set of clients and the database server, the resource consumption data derived from the processing, storage or input/output (I/O) resources of the enforcement point;

based on the resource consumption data for at least some of the set of security rules, dynamically determine resources of the enforcement point available for database security rule validation; and based on the available resources of the enforcement point, select which security rules in the set of security rules are activated by making a particular security rule active in the first SRE and inactive in the second SRE.

16. The computer program product as described in claim 15 wherein the program code comprises program code configured to distribute the particular security rule only to the first SRE.

17. The computer program product as described in claim 16 wherein the program code configured to select which security rules are activated includes program code configured to switch off the particular security rule in the second SRE.

18. The computer program product as described in claim 15 wherein the resource consumption data comprises one of: processor parameters and usage, available and consumed memory, process execution time, current rule performance impact on an operating system, I/O consumption parameters, latency, and combinations thereof.

19. The computer program product as described in claim 15 wherein the program code to select which security rules in the set are active is also based on an additional information.

20. The computer program product as described in claim 19 wherein the additional information includes one of: security rule validation frequency, and data indicating a current context associated with a traffic flow.

21. The computer program product as described in claim 15 wherein the program code to select which rules in the set are active based on the available resources maximizes an average validation throughput at the enforcement point for the set of security rules.

\* \* \* \* \*